United States Patent Office 3,660,514
Patented May 2, 1972

3,660,514
OXIDATIVE DEHYDROGENATION PROCESS AND CATALYST
Robert S. Cichowski, Bartlesville, Okla., assignor to Phillips Petroleum Company
No Drawing. Filed Aug. 6, 1970, Ser. No. 61,830
Int. Cl. C07c 5/18
U.S. Cl. 260—680 E      7 Claims

ABSTRACT OF THE DISCLOSURE

Alkenes, alkylpyridines and alkylaromatics are dehydrogenated by contact with oxygen in the temperature range of 750 to 950° F. in the presence of a catalyst comprising iron phosphate promoted by rhenium.

---

It is common practice in the chemical industry to produce monomers such as isoprene and butadiene by dehydrogenating appropriate butenes. Numerous dehydrogenation catalysts are known for this process, one such catalyst being iron phosphate.

In accordance with the present invention it has been found that improved yields are obtained in oxidative dehydrogenation process employing an iron phosphate if the catalyst is promoted by rhenium and the process is carried out in the temperature range of 750 to 950° F.

The catalyst of the present invention is an iron/phosphorus/rhenium/oxygen catalyst which contains from about 0.05 to about 20, preferably from about 0.1 to about 5 weight percent rhenium based upon the weight of the total composite. In addition, the amount of phosphorus present in the catalyst is in excess of the stoichiometric amount required for the phosphorus to react in the form of phosphate ions ($PO_4^{-3}$) with all of the iron in the catalyst. Thus, the amount of phosphorus present is in the range from about 1.01 to about 5, preferably from about 1.01 to about 2 times, such stoichiometric amount. The iron in these catalyst compositions can be in the ferric, ferrous, or ferroso-ferric forms, hence the stoichiometric phosphorus content will vary accordingly such as shown in the following table.

| Compound | Stoichiometric P content, wt. percent |
|---|---|
| Ferric phosphate: $FePO_4$ | 20.5 |
| Ferrous phosphate: $Fe_3(PO_4)_2$ | 17.3 |
| Ferroso-ferric phosphate: [1] $(1/3Fe_3(PO_4)_2+2FePO_4)$ | 19.6 |

[1] Considered to be derived from magnetic iron oxide ($Fe_3O_4$ or $FeO \cdot FePO_4$).

The catalyst composition can be prepared by several procedures. It is generally preferred to prepare the iron phosphate composition and then to impregnate this composition with a suitable rhenium compound which is convertible to the oxide on calcination.

For example, the iron/phosphorus/oxygen composition can be prepared by treating an iron oxide, iron hydroxide, an iron phosphate, or other iron salt with a suitable quantity of phosphoric acid. Alternatively, iron oxides or iron salts can be dry mixed with phosphorus pentoxide or the like. Similarly, iron phosphates can be precipitated under conditions such that the precipitate contains a sufficient amount of excess phosphorus.

The iron phosphate composite can be impregnated by conventional procedures with suitable solutions, either aqueous or organic, of rhenium compounds which are convertible to the oxide on calcination. For example, an iron phosphate composite can be impregnated with aqueous solutions of perrhenic acid or ammonium perrhenate. In the same manner, an organo rhenium compound, such as bis(triphenylphosphine)tetrachlororhenium, can be used to impregnate an iron phosphate while in a hydrocarbon solution. Following the impregnation, the impregnated composite is dried and calcined in air, such as in the temperature range of 800 to 1400° F. for 1 to 25 hours, preferably 1100 to 1300° F. for 2 to 8 hours.

An additional pre-treatment of the catalyst at an elevated temperature in an essentially reducing atmosphere, can sometimes increase its activity still further. Consequently, it is generally preferred to subject the catalyst to temperatures in the range of 1000 to 1200° F., preferably 1050 to 1150° F. for 0.1 to 10 hours while in a reducing atmosphere of flowing hydrocarbon, hydrogen or the like.

The catalysts of this invention can be used in the form of granules, mechanically formed pellets, or other conventional form. These catalysts can also be employed with suitable supporting or diluting materials such as silica, alumina, boria, magnesia, titania, zirconia, and combinations thereof.

The feed materials which can be dehydrogenated in accordance with this invention include alkenes, alkylpyridines and alkylaromatics. More specifically, alkenes having from 3 to 10, preferably 4 to 6, carbon atoms per molecule, and cycloalkenes containing from 4 to 10, preferably 4 to 6, carbon atoms per molecule can be converted to the corresponding alkadienes and cycloalkadienes. In addition, alkylpyridines and alkylaromatics, containing from 1 to 4, preferably from 1 to 2 alkyl groups per molecule wherein the alkyl groups themselves contain from 1 to 6, preferably from 2 to 6, carbon atoms per group, with at least one alkyl group having at least 2 carbon atoms, can be converted to the corresponding alkenyl-substituted pyridines and alkenyl-substituted aromatics.

Some examples of applicable feedstocks are propylene, n-butenes, n-pentenes, isopentenes, octenes, decenes, cyclobutene, cyclopentene, cyclohexene, 3 - isobutylcyclopentene, ethylbenzene, propylbenzene, isobutylbenzene, 1-methyl-2-propylbenzene, 1-butyl-3-hexylbenzene, ethylpyridine, 2-methyl-5-ethylpyridine, 2,3,4 - triethylmethyl-5-ethylpyridine, 2-ethyl-5-hexylpyridine, and the like, and mixtures thereof. Particularly useful conversions according to this invention are the conversion of isopentenes to isoprene, the conversion of ethylbenzene to styrene, and the conversion of 2-methyl-5-ethylpyridine to 2-methyl-5-vinylpyridine.

Generally, at least trace amounts of oxygenated products are also formed in these reactions. For example, compounds such as furan and acetaldehyde are obtained from the conversion of butenes. Similarly, compounds such as furfural, acetaldehyde and acetic acid are obtained from the conversion of pentenes.

The process of this invention is ordinarily carried out by forming a mixture, preferably a preheated mixture, of the organic feed, steam (if used), and, oxygen or an oxygen-containing gas, and passing this mixture in contact with the catalyst in the desired temperature range. Air is generally the preferred oxygen-containing gas because of its availability at low cost. Any suitable mode of contact using any suitable type of reactor can be used.

In the reaction zone, the temperature can be in the range of 750 to 950° F., preferably 800 to 900° F. The pressure can be from about 0.05 to about 250, preferably from about 0.1 to about 25, p.s.i.a. The volumetric oxygen: organic feed ratio can be in the range of from about 0.1:1 to about 3:1, preferably from about 0.5:1 to about 2:1. When steam is used, a volumetric steam:organic feed ratio can be in the range of 0.1:1 to about 100:1, preferably 5:1 to 20:1. The gaseous hourly space velocity (GHSV) of the organic feed will generally be from about 50 to about 5000, preferably from about 100 to about 2500 volumes of organic vapor per volume of catalyst per hour.

The catalyst of this invention, particularly when steam is used, can be employed for long periods without reactivation. However, if and when reactivation becomes necessary, it can be effected by simply stopping the flow of organic feed and allowing the flow of the other components of the feed mixture, namely the air and steam, to continue for a suitable reactivation period.

four hours. For purposes of comparison, a similar but rhenium-free catalyst was also prepared.

These catalysts were then charged into a fixed bed catalytic reactor and tested for oxidative dehydrogenation of 2-methylbutene-2 at atmospheric pressure, and at a 2-methylbutene-2 feed rate of 200, an air feed rate of 1000, a steam rate of 5000 GHSV.

The operating conditions and results of the runs are shown in Table 1.

TABLE 1

Dehydrogenation of 2-methylbutene-2 to isoprene

|  | Catalyst A | Catalyst B | Catalyst C |
|---|---|---|---|
| Catalyst analysis, wt. percent. | 31 Fe/21.9 P/0.0 Re | 29 Fe/20.0 P/6.3 Re | 31 Fe/20.0 P/5.0 Re |
| Activation | | 4 hours at 1,100° F. in air | |
| Pre-run conditioning | | ~1 hour at 900° F. in air/steam only | |
| Conversion at 900° F.: | | | |
| C/M/Y at 15 min.ª | 6/99/6 | 21/98/21 | 16/99/16 |
| C/M/Y at 195 min | 9/98/9 | 21/97/20 | 18/98/18 |
| Cool down | | ~1 hour in air/steam at 900-800° F. | |
| Conversion at 800° F.: | | | |
| C/M/Y at 15 min | 0/0/0 | 5/97/5 | 4/99/4 |
| C/M/Y at 195 min | 2/99/2 | 5/97/5 | 4/99/4 |

ª C/M/Y are percent conversion/percent modivity/percent yield. Modivity is a simplified selectivity based on gas phase products only.

Over prolonged periods of service, the catalyst can lose some of its phosphorus content. Consequently, to maintain the catalyst in a high level of activity, a small quantity of a phosphorus-containing compound can intermittently or continuously be introduced into the reaction zone during operation. The level of phosphorus addition can correspond to the level of phosphorus loss as can be determined generally by analysis of the reactor effluent, particularly analysis of the steam condensate. Compounds such as phosphoric acid, or phosphorus pentoxide, as well as other phosphorus compounds such as acids, anhydrides, organo-substituted phosphines, and the like can be used.

Some loss of rhenium can also occur in the catalyst on extended operation but this is less critical, so long as a minimum effective amount of the rhenium still remains.

The following examples are illustrative of the process of this invention:

EXAMPLE 1

Several iron/phosphorus/oxygen catalysts were prepared which contained various levels of rhenium promoter. The catalysts were prepared by impregnating commercial 9-20 mesh $Fe_3(PO_4)_2$ with phosphoric acid (85 wt. percent $H_3PO_4$) and with perrhenic acid ($HReO_4$). After impregnation the catalysts were calcined in air by bringing them up to a temperature of 1100° F. over a four-hour period, then maintaining them at 1100° F. for another The data in the table above show that the rhenium-containing Catalysts B and C show improved yields of isoprene over the yields of the corresponding rhenium-free Catalyst A.

EXAMPLE 2

Several more runs were made with fresh portions of both the rhenium-containing and the rhenium-free catalysts. These runs also included operation at 1050° F., a temperature outside the scope of this invention. The space rates for the feed, air, and steam were 200, 1000, and 5000 GHSV respectively.

The operating conditions and results of these runs are shown in Table 2.

TABLE 2

Dehydrogenation of 2-methylbutene-2 to isoprene

|  | Catalyst A | Catalyst D | Catalyst B | Catalyst C |
|---|---|---|---|---|
| Analysis before tests, wt. percent | 31 Fe/21.9 P/0.0 Re | 29 Fe/21.4 P/5.5 Re | 29 Fe/20.0 P/6.3 Re | 31 Fe/20.0 P/5.0 Re |
| Activation | | Calcination in air at 1,100° F. for 4 hours | | |
| Pre-run conditioning | | 1 hour at 1,050° F. in air/steam only | | |
| Reaction at 1,050° F: | | | | |
| C/M/Y at 15 min.ª | 40/95/38 | 59/84/50 | 80/88/70 | 86/86/74 |
| C/M/Y at 195 min | 78/91/71 | 61/85/52 | 65/86/56 | 72/85/61 |
| Cool down | | ~1 hour at 1,050-900° F. in air/steam only | | |
| Reaction at 900° F.: | | | | |
| C/M/Y at 15 min | 30/97/29 | 49/84/50 | 67/87/58 | 68/82/56 |
| C/M/Y at 195 min | 40/92/37 | 51/82/41 | 60/85/51 | 71/84/60 |
| Pre-run conditioning ᵇ | | 1 hour at 900° F. in steam/air only | | |
| Reaction at 900° F.: | | | | |
| C/M/Y at 15 min | | | 52/95/49 | 42/98/41 |
| C/M/Y at 195 min | | | 64/86/54 | 64/87/56 |
| Cool down | | ~1 hour at 900-800° F. in steam/air only | | |
| Reaction at 800° F.: | | | | |
| C/M/Y at 15 min | | | 52/78/41 | 39/90/35 |
| C/M/Y at 195 min | | | 46/81/37 | 28/93/26 |
| Analysis after tests, wt. percent | | | 35 Fe/19.5 P/0.3 Re | 34 Fe/19.3 P/0.6 Re |

ª C/M/Y refers to conversion/modivity/yield. Modivity is a simplified selectivity based on gas phase products only.
ᵇ Same catalyst charge tested again on another day at lower temperature.

The data in this table above show that the yields using the rhenium-containing catalyts are improved over those of the rhenium-free catalysts, except at 1050° F. A comparison of the 800 and 900° F. data of Table 1 and Table 2 shows that the performance of the catalysts of this invention is somewhat enhanced at these relatively low temperatures, by first exposing the catalysts to reducing conditions at higher temperatures such as the conditions present in the earlier conversion runs at 1050° F.

EXAMPLE 3

For purposes of comparison, several additional runs were carried out in a manner substantially identical with those of the preceding example except that manganese, another element of Group VII-B, was used in place of rhenium, as a catalyst promoter. Three manganese-containing catalysts, catalysts B', C', and D', were prepared in the same manner as rhenium-containing catalysts B, C and D of Example 2 except that instead of being impregnated with phosphoric acid and perrhenic acid, the iron phosphate was impregnated with thet same amount of phosphoric acid and with an amount of manganese which was the molar equivalent of the rhenium used in preparing catalysts A, B and C. The manganese was added as a solution obtained by dissolving the required amount of metal in nitric acid. After impregnation, the manganese-promoted catlysts were calcined in air for 4 hours at 1200° F.

These catalysts were then tested for the dehydrogenation of 2-methylbutene-2-under the same conditions as Example 2. The results are shown in the following table. For convenience of comparison, corresponding results from the rhenium-containing catalysts are also shown.

TABLE 3

Dehydrogenation of 2-methylbutene-2 to isoprene

| Catalyst: | 900° F.(a) C/M/Y(b) | 1,050° F.(a) C/M/Y(b) |
|---|---|---|
| A (unpromoted) | 40/92/37 | 78/91/71 |
| D Re | 51/82/42 | 61/85/52 |
| D' Mn | 19/90/17 | 40/9/37 |
| B Re | 60/85/51 | 85/86/56 |
| B' Mn | 60/82/50 | 72/87/63 |
| C Re | 71/84/60 | 72/85/61 |
| C' Mn | 62/87/54 | 73/86/63 | a Sampled at 3¼ hours on stream.
b Percent conversion/percent modivity/percent yield.

Each of the rhenium-containing catalysts was substantially better than the corresponding manganese-containing catalyst at 900° F., a temperature within the range of this invention.

While this invention has been described in conjunction with presently preferred embodiments, it should be evident that it is not limited thereto.

What is claimed is:

1. The method of dehydrogenating a material selected from the group consisting of (1) alkenes containing from 3 to 10 carbon atoms per molecule, (2) cycloalkenes containing from 4 to 10 carbon atoms per molecule, (3) alkylpyridines containing from 1 to 4 alkyl groups per molecule wherein at least one such group contains at least 2 carbon atoms, and (4) alkylaromatics containing from 1 to 4 alkyl groups per molecule wherein at least one such group contains at least 2 carbon atoms, which method comprises contacting such material with oxygen in the temperature range of 750 to 950° F. in the presence of a catalyst comprising iron phosphate promoted by rhenium, the rhenium comprising about 0.05 to 20 weight percent of the total catalyst composition.

2. The method of claim 1 wherein the contacting is carried out in the temperature range of 800 to 900° F.

3. The method of claim 1 wherein the material is an isopentene.

4. The method of claim 1 wherein the material is 2-methylbutene-2.

5. The method of claim 1 wherein the contacting is carried out in the presence of steam.

6. A catalyst useful in carrying out oxidative dehydrogenation reactions consisting essentially of iron phosphate having rhenium associated therewith, the amount of rhenium comprising about 0.05 to 20 weight percent of the total catalyst composition.

7. The catalyst of claim 6 wherein the rhenium is present as rhenium oxide.

References Cited

UNITED STATES PATENTS

| 3,110,746 | 11/1963 | Voge et al. | 260—680 |
| 3,207,806 | 9/1965 | Bajars | 260—680 |
| 3,409,697 | 11/1968 | Callahan et al. | 260—680 |
| 3,423,331 | 1/1969 | Eden | 252—437 |
| 3,492,247 | 1/1970 | Eden | 252—437 |

PAUL M. COUGHLAN, JR., Primary Examiner

U.S. Cl. X.R.

252—437; 260—290 V, 666 A, 669 R